UNITED STATES PATENT OFFICE.

ARTHUR R. BULLOCK, OF CLEVELAND, OHIO.

PROCESS FOR THE ELECTROLYTIC TREATMENT OF CARBON.

1,314,632.   Specification of Letters Patent.   Patented Sept. 2, 1919.

No Drawing.   Application filed October 2, 1914.   Serial No. 864,643.

*To all whom it may concern:*

Be it known that I, ARTHUR R. BULLOCK, a citizen of the United States, residing at Cleveland, in the county of Cuyahoga and State of Ohio, have invented a certain new and useful Improvement in Processes for the Electrolytic Treatment of Carbon, of which the following is a full, clear, and exact description.

This invention relates to a process for the electrolytic treatment of carbon or material containing carbon in accordance with which process the carbon when utilized as an anode electrode in an electrolytic cell will, by the electrolytic action, be gradually removed from the electrode and incorporated as a part of the electrolyte.

Generally speaking, the invention comprises the process and the steps thereof set forth in the accompanying claims.

I have discovered that under certain conditions which may be controlled, a carbon anode electrode when immersed in a suitable electrolyte, will, under the action of the electric current, be made to dissolve or substantially dissolve in the electrolyte and can also be made to form a precipitate in the electrolyte under certain conditions, which precipitate may be subsequently recovered and utilized in various ways, and in the case where the carbon has apparently gone into solution, the carbon may be subsequently recovered from the solution.

In order to explain in a concrete manner the operation of my process, I will describe in detail certain experiments.

If in an electrolyte of sodium sulfate, which sulfate is dissolved in water, a carbon anode and a cathode be immersed, and the electric current be caused to flow between the electrodes through the electrolyte, the anode is attacked and if the electrolyte is previously acidified slightly, preferably with sulfuric acid, the carbon will, as it were, be plated from the anode and pass into the electrolyte in what I term a dissolved or substantially dissolved condition.

Whether the carbon which disappears from the anode unites with the electrolyte to form a different chemical substance, or is merely in dissolved or substantially dissolved condition in the electrolyte, I cannot at the present time state, but the electrolyte when the current is caused to flow for a period of time remains clear so far as any precipitate is concerned, except perhaps such material which may be in the anode, and it is not acted upon, as for instance silica or other similar substance which occur as impurities in the carbon, where precautions are not taken to prevent particles from the carbon electrode from becoming mechanically detached.

The electrolyte changes color as the process continues, assuming a brownish or reddish brown color, which becomes darker or more dense, approaching a black as the flow of current is continued.

The anode electrode may be either a solid piece of carbon, or the electrode may be in a more or less finely divided condition, in which latter condition it is supported in the electrolyte in some suitable container which is not affected by the electrolytic action.

I have found that if a solid carbon electrode be wrapped or enveloped by a porous container, and the carbon made to be the anode electrode in my process, the electrolytic action upon the carbon will soften and disintegrate the electrode until it becomes a crumbly mass. I have found that this procedure hastens the electrolytic action upon the anode electrode, and I consider that it gives somewhat better results, generally speaking, than the use of a solid carbon anode.

I have also discovered that various forms of carbon respond to my process, that is to say, carbon which is prepared in the form of blocks or masses, or chunks of coke or Atcheson graphite will all respond so far as the electrolytic action is concerned.

If the sodium sulfate electrolyte is neutral or slightly alkaline, instead of acid, I find that the anode electrode is attacked in the same manner as previously described. However, the carbon which is removed by the process from the anode does not entirely remain in solution in the electrolyte, but in part forms a precipitate in the electrolyte, which precipitate is black and bulky.

This precipitate, however, I believe is not a mere bodily removal of the carbon from the electrode, for, if the carbon anode electrode be carefully wrapped or placed in a suitable container which would prevent particles passing from the electrode, the precipitate is nevertheless formed in the electrolyte.

I therefore am of the opinion that the carbon is in the first instance dissolved from the electrode, in which condition it passes through the wrapping or container for the electrode and subsequently forms a precipitate in the general body of the electrolyte.

In my experiments I have used various strengths of sodium sulfate solution, all of which apparently act with equal facility but the speed of reaction differs with different strengths of solution. The current required is comparatively small, and I have produced the electrolytic action with as low a current value as one-eighth of an ampere but better results are obtained where the current strength is about .5 of an ampere for six sq. in. of anode surface and with substantially the same area at the cathode. Good results are obtained when the voltage is regulated to be in the neighborhood of 3½ to 4 volts.

The electrolyte containing the carbon which I term dissolved or substantially dissolved carbon, may be subsequently treated in a variety of ways with different results, but for one purpose I have treated the electrolyte to recover carbon in very finely divided condition.

By treating the electrolyte with a basic alkali, as an example of which I would mention sodium carbonate, and heating the solution, I obtain a black precipitate which settles but slowly. This precipitate is substantially the same material so far as I can discover as the precipitate produced in the electrolytic bath when sodium sulfate is used as an electrolyte and the electrolyte has an alkaline litmus reaction.

Upon separating the precipitate and heating the same and subsequently washing out soluble impurities, I finally obtain substantially pure carbon in an exceedingly finely divided condition.

Sodium sulfate either neutral or acid, is not the only electrolyte which I may use. I have successfully dissolved carbon from a carbon anode in an electrolytic cell when using an electrolyte containing tannin, and I have also successfully used an electrolyte composed of an emulsion of olive oil and lemon juice. This latter electrolyte is not commercially practical, but it is interesting as an experiment.

Further I have found that where the carbon anode is wrapped in porous material and the electrolytic action started using sodium sulfate, as an electrolyte, and subsequently the anode is removed to a cell in which the electrolyte is composed of sulfuric acid and water, the electrolytic action will continue and carbon be dissolved from the anode electrode. The action, however, is not so rapid as with the use of other electrolytes.

In using tannin as the basis of the electrolytic bath, the carbon is taken from the anode electrode and passes, as I term it, into solution. The carbon may be subsequently recovered from the solution in very finely divided form by adding suitable precipitating agents, such as alum, to the solution, and subsequently adding sulfuric acid in sufficient proportion to make the solution acid. After the treatment just described there remains an insoluble precipitate which, when separated from the solution, and washed and dried, is found to be carbon in an exceedingly finely divided condition.

I have found that it is possible to add to the electrolytic bath containing the tannin certain substances which will increase the conductivity, but which apparently have no effect upon the electrolytic action. Among the substances which I have just tried I would mention sodium sulfate, sulfuric acid, and hydrochloric acid.

While I have described my process in connection with the production of finely divided carbon, I do not wish to limit myself to this particular result, for I believe that my discovery of the fact that carbon may, by electrolysis, be caused to pass in apparently dissolved form from an anode electrode to the electrolyte, and further my discovery that carbon may be caused to leave the anode electrode and form a precipitate in the electrolytic bath is a new discovery.

Throughout the specification and claims, the use of the word "carbon" is not restricted to pure carbon; there may be impurities in the carbon which may or may not be subsequently separated from any product produced by the process herein described.

Having described my invention, I claim:

1. The process of treating carbon which consists in immersing a cathode electrode and a carbon anode electrode in an electrolytic bath, passing an electric current from anode to cathode, regulating the amperage and voltage of said current so as to cause the carbon to be removed from the anode and to pass to the electrolyte.

2. The process of treating carbon which consists in immersing a cathode electrode and a carbon anode electrode in a suitable electrolyte passing a current of suitable voltage and amperage from the anode to the cathode for causing the carbon to be dissolved from the anode and pass in solution or substantially in solution in the electrolyte.

3. The process of treating carbon which consists in immersing a cathode electrode and a carbon anode electrode inclosed in a porous container in a suitable electrolyte passing an electric current from the anode to the cathode, regulating the amperage and voltage of said current to cause the carbon to pass from the anode and pass to the electrolyte.

4. The process of treating carbon which consists in immersing a cathode electrode and a carbon anode electrode in an electrolyte containing a substance having an effect upon carbon similar to tannin when an electric current is caused to pass between the anode and cathode passing an electric current of proper voltage and amperage from the anode to the cathode thereby causing the carbon to pass from the anode to the electrolyte.

5. The process of treating carbon which consists in immersing a cathode electrode and a carbon anode electrode in an electrolyte containing tanning, causing a current to pass between the electrodes and regulating the amperage and voltage of said current.

6. The process of treating carbon which consists in obtaining a solution carrying carbon in dissolved or substantially dissolved condition, and in subsequently precipitating and recovering the carbon.

7. The process of treating carbon which consists in obtaining a solution carrying carbon in dissolved or substantially dissolved condition, and in subsequently recovering the carbon from the said solution.

In testimony whereof, I hereunto affix my signature in the presence of two witnesses.

ARTHUR R. BULLOCK.

Witnesses:
A. J. HUDSON,
L. I. PORTER.